United States Patent
Arngren et al.

(10) Patent No.: US 11,503,530 B2
(45) Date of Patent: Nov. 15, 2022

(54) METHOD AND CONTROLLER FOR CONTROLLING A WIRELESS LINK

(71) Applicant: Telefonaktiebolaget LM Ericsson (publ), Stockholm (SE)

(72) Inventors: Tommy Arngren, Södra Sunderby (SE); Jan Christoffersson, Luleå (SE); Mårten Ericson, Luleå (SE); Min Wang, Fuleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/960,957

(22) PCT Filed: Feb. 23, 2018

(86) PCT No.: PCT/EP2018/054562
§ 371 (c)(1),
(2) Date: Jul. 9, 2020

(87) PCT Pub. No.: WO2019/161919
PCT Pub. Date: Aug. 29, 2019

(65) Prior Publication Data
US 2020/0374778 A1    Nov. 26, 2020

(51) Int. Cl.
| | | |
|---|---|---|
| *H04W 40/12* | (2009.01) | |
| *H04B 7/185* | (2006.01) | |
| *H04L 45/122* | (2022.01) | |
| *H04W 40/08* | (2009.01) | |
| *H04W 40/22* | (2009.01) | |
| *H04W 40/24* | (2009.01) | |

(52) U.S. Cl.
CPC ........ *H04W 40/12* (2013.01); *H04B 7/18504* (2013.01); *H04L 45/122* (2013.01); *H04W 40/08* (2013.01); *H04W 40/22* (2013.01); *H04W 40/248* (2013.01)

(58) Field of Classification Search
None
See application file for complete search history.

(56) References Cited

U.S. PATENT DOCUMENTS 6,735,178 B1 *  5/2004  Srivastava ............. H04L 12/44
                                                    370/252
8,571,468 B2 * 10/2013  Hart ...................... H04W 52/46
                                                    455/13.1

(Continued)

FOREIGN PATENT DOCUMENTS

EP      2557840 A1    2/2013
WO  2016190793 A1   12/2016

*Primary Examiner* — Brian S Roberts
(74) *Attorney, Agent, or Firm* — Coats & Bennett, PLLC (57) ABSTRACT

A method, a system and a controller for controlling the Quality of Service, QoS, of a wireless link, providing a service from a transmitting entity to a receiving entity is suggested. Once data, decisive of the QoS of the hops of the wireless link has been received, it is determined, based on the received data, that at least one QoS target-value of one of said hops is, or is predicted, not to be met. For each of the mentioned hops, one or more actions for achieving that said at least one QoS target-value is met, is initiated and based on the determining of one or more actions, instructions, instructing at least one of the mobile relay stations how to execute one or more of said determined actions are initiated.

19 Claims, 5 Drawing Sheets

(56) References Cited

U.S. PATENT DOCUMENTS

| | | | |
|---|---|---|---|
| 9,313,667 B1 | 4/2016 | Daoura | |
| 2003/0202476 A1* | 10/2003 | Billhartz | H04L 45/302 370/236 |
| 2004/0218548 A1* | 11/2004 | Kennedy | H04W 40/02 370/254 |
| 2005/0053094 A1* | 3/2005 | Cain | H04W 16/10 370/469 |
| 2006/0262737 A1* | 11/2006 | Livet | H04L 45/302 370/254 |
| 2010/0260113 A1* | 10/2010 | Liu | H04B 7/15542 455/452.2 |
| 2013/0021941 A1* | 1/2013 | Zheng | H04W 28/16 370/252 |
| 2014/0220923 A1* | 8/2014 | Shoshan | H04W 16/32 455/404.1 |
| 2017/0012697 A1 | 1/2017 | Gong et al. | |
| 2017/0295609 A1* | 10/2017 | Darrow | H04W 84/18 |
| 2019/0132784 A1* | 5/2019 | Thubert | H04W 72/044 |

\* cited by examiner

METHOD AND CONTROLLER FOR CONTROLLING A WIRELESS LINK

TECHNICAL FIELD

The present disclosure relates to a system, method and a controller for controlling relay stations of a wireless link.

BACKGROUND

The market for drones, or Unmanned Aerial Vehicles (UAVs), is quickly expanding, both with respect to number of drones, types of drones and use cases, or applications, where drones can be used. UAVs are therefore rapidly becoming an everyday presence, and it is expected that they will play an important part in our future. However, already available or planned use cases include e.g. delivery services, aerial photography and film making, remote sensing for agriculture, city planning, civil engineering, public safety support and rescue services. There are many types of UAVs available on the market, that can be remotely controlled, using e.g. Wi-Fi or some proprietary radio access. Many UAVs are also not only capable of communicating different types of data, sensing data, and/or operating autonomously, but also of analysing data collected by sensors or captured by a camera. UAVs can also be used as mobile relay stations between ground-based nodes, such as e.g. radio base stations and ground based terminals, or serve as mobile radio base stations, thereby providing cellular or wireless coverage to users which are located within range of the UAVs.

U.S. Pat. No. 9,313,667B1 disclose a method for controlling a plurality of UAVs, providing a communication link, from a supervising UAV.

WO2016190793 disclose a method for adjusting movement of a wireless transceiver, such as e.g. a UAV.

There is, however, a desire to provide a more flexible way of controlling a plurality of UAVs, when setting up a wireless link.

SUMMARY

It is an object of the present document to address, or at least alleviate, at least some of the problems described above.

According to one aspect, a system for controlling the Quality of Service, QoS, of a wireless link, providing a service from a transmitting entity to a receiving entity, is suggested. The system comprises a controller, capable of controlling a plurality of relay stations, including a plurality of mobile relay stations, and is configured to: receive data, decisive of the QoS of the hops of the wireless link; determine that, at least one QoS target-value of one of said hops is, or is predicted, not to be met, wherein such a determining is based on the received data; determine, for at least one of the mentioned hops, one or more actions for achieving that the at least one QoS target-value is met, and initiating, based on the determining of one or more actions, execution of the one or more determined actions.

She suggested system provides for a more flexible control of a wireless link, provided by a plurality of relay stations, comprising at least a number of mobile relay stations.

According to another aspect, a method for controlling the Quality of Service, QoS, of a wireless link, providing a service from a transmitting entity to a receiving entity, is suggested. The wireless link is being provided by a plurality of relay stations, including a plurality of mobile relay stations, and the method comprise: receiving data, decisive of the QoS of the hops of the wireless link; determining, based on the received data, that at least one QoS target-value of one of the mentioned hops is, or is predicted, not to be met; initiating, for at least one of the mentioned hops, determination of one or more actions for achieving that the at least one QoS target-value is met, and initiating, based on the determining of one or more actions execution of one or more of the determined actions.

According to yet another aspect, a computer program for controlling the Quality of Service (QoS) of a wireless link, as disclosed above, is suggested. More specifically, the computer program is configured to cause a controller to operate as a controller according to a method as disclosed above.

According to another embodiment, a computer program product, comprising a computer readable medium and a computer program as disclosed above, wherein the computer program is stored on the computer readable medium, is suggested.

According to yet another aspect, a controller for controlling the Quality of Service (QoS) of a wireless link, providing a service from a transmitting entity to a receiving entity, where the wireless link is being provided by a plurality of relay stations, including a plurality of mobile relay stations, is suggested. The controller is being configured to: receive data, decisive of the QoS of the hops of the wireless link; determine, based on the received data, that at least one QoS target-value of one of the hops is, or is predicted, not to be met; initiate, for at least one of the mentioned hops, determining of one or more actions for achieving that the at least one QoS target-value is met, and initiate, based on the determining of one or more actions, execution of one or more of the determined actions.

According to yet another aspect a controller for controlling the Quality of Service (QoS) of a wireless link, providing a service from a transmitting entity to a receiving entity, where the wireless link is provided by a plurality of relay stations, including a plurality of mobile relay stations, is suggested. The controller comprises processing circuitry and a memory, storing computer readable instructions, which, when executed by the processing circuitry, causes the controller to: receive, data, decisive of the QoS of the hops of the wireless link; determine, based on the received data, that at least one QoS target-value of one of the mentioned hops is, or is predicted, not to be met; initiate, for at least one of the mentioned hops, initiation of one or more actions for achieving that the at least one QoS target-value is met, and initiate, based on the determining of one or more actions, execution of one or more of the determined actions.

BRIEF DESCRIPTION OF DRAWINGS

Embodiments will now be described in more detail in relation to the accompanying drawings, in which.

DETAILED DESCRIPTION

Briefly described, a method and a controller for controlling a plurality of mobile nodes, capable of relaying content over a wireless link, is suggested. More specifically, mobile nodes, comprising at least two mobile relay stations, such as e.g. UAVs, are arranged to provide a wireless link between two communicating entities, offering one or more services at a required Quality of Service (QoS). Such a link may serve practically all the way from device to device, or it may provide only a limited part of an end-to-end communication link, where remaining nodes may comprise e.g. nodes of a fixed, operable communication network, operating in a conventional manner. Throughout this document UAV and mobile relay station will be used interchangeably, thereby implying that the UAVs, as disclosed herein, are to be referred to as UAVs comprising relaying functionality. Alternatively, a mobile relay station may be provided in the form of a mobile robot, having relaying and mobility functionality, which can be controlled by the controller, disclosed herein.

The suggested wireless link may replace permanent communication infrastructure, which is temporary unavailable, e.g. due to a natural disaster, or it may be used as a supplement to permanent communication infrastructure during a temporary peak. In both mentioned scenarios it will be advantageous if a required QoS target can be supervised and maintained at the wireless link in a dynamic and flexible manner. The method which will be described below has been developed to fill the mentioned purposes, in a flexible manner.

When using a plurality of UAVs or other mobile devices as mobile relay stations, such a use provides for higher flexibility than if only fixed relay stations were to be used, due to the mobility, and, the ability to adjust various parameters of the mobile relay stations adaptively, due to changes in the transmission environment. However, such a flexibility also raises a demand for optimization of possible adaptations, especially if different types of mobile relay stations, having different capabilities, are used over a wireless link. QoS can be expressed e.g. as a required latency or bit rate, which can be maintained by adjusting various parameters at the mobile relay station, such as e.g. the distance between two or more mobile relay stations, and/or the transmitting power of one or more of the mobile relay stations, thereby adjusting the wireless link on a hop-by-hop basis. Some hops between two relay stations, or between a fixed node and a relay station, may have lower capacity than others, e.g. due to the relative distance, or blocking of a radio signal between the nodes, while other hops may be able to handle more variation in latency. By dividing an overall QoS requirement or target of a wireless link, provided by a plurality of mobile relay stations, into QoS sub-targets on a per hop basis, e.g. each hop between mobile relay stations of the wireless link is divided into a respective latency target, a controller will be able to strive for maintaining the overall QoS requirements of the wireless link by controlling, coordinating and optimizing the mobile relay stations, based on the determined QoS sub-targets.

Once aware of the QoS sub-targets, applicable for the various hops of a wireless link, each link can be adapted accordingly, by dynamically adjusting one or more parameters, which have a direct or indirect impact on the QoS of the wireless link. Since e.g. distribution of a video service will give rise to a first QoS target level, while a less demanding service, such as e.g. Web browsing, typically will give rise to a second, lower QoS target level, the QoS target, and sub-targets, are typically considered on a per service basis. However, QoS targets may alternatively be considered on a per device basis, or even on a per device group basis. In the first scenario, a QoS target is applied for each service, while in the second scenario, a QoS target is maintained for all services associated with a certain device, while the latter case provides for one QoS, applicable for all services used by a group of devices. While the first scenario provides for a more efficient use of available resources, the two later scenarios provide for a less complex solution.

The controller receives data decisive for the QoS of the wireless link, from the mobile relay stations, where such data may be provided to the controller at a regular basis, following a certain reporting frequency, on an event triggered basis, or as a combination thereof. Regularly delivered data will allow the controller to proactive adapt to changes, while event triggered data may be useful for providing data instantly when events which are difficult to predict occur and which appear unexpectedly, e.g. a fast deterioration in the transmission conditions, may trigger an increase of the reporting frequency. As will be described in further detail below, it can also be advantageous to apply a dynamic frequency, or frequencies, for the data update, where all or some of the reporting is done according to at an adaptive frequency or frequencies.

By applying a QoS sub-target for each hop, which comprise at least one mobile relay station, and by receiving data decisive of the QoS sub-targets at each respective hop, the controller will be able to consider various options, decide on, or trigger decision of, one or more preferred options, after which instructions are provided from the controller, or triggered by the controller but provided from another entity or node, to the respective mobile relay stations, instructing the respective relay station on one or more specific actions to be executed. In case of a more decentralised solution, instructions may be limited to providing an indication to a mobile relay station that an adaptation is needed by the mobile relay station, possibly together with data on which an adaptation decision is to be based by the mobile relay station. In the latter scenario, the instruction that an adaptation of one or more parameters is needed can e.g. comprise a numerical interval, within which the adaptations are allowed.

Figure 1:
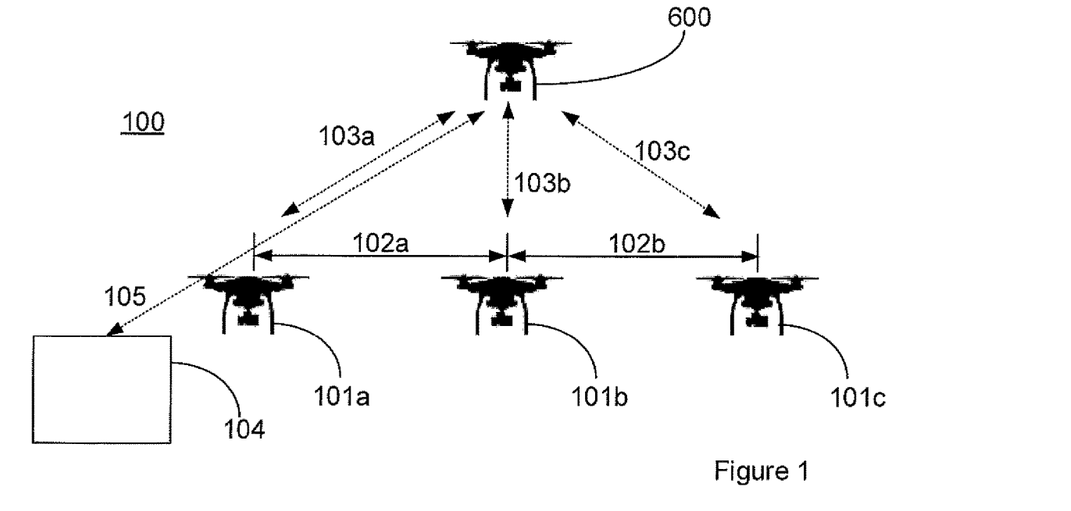
FIG. 1 is an overview of a system comprising a controller and a plurality of mobile relay stations, here exemplified by UAVs, wherein the controller is configured to control the mobile relay stations.

FIG. 1 is an overview of a system, comprising three mobile relay stations, here represented by three UAVs, 101a,101b, 101c, which are capable of providing a wireless link by operating as mobile relay stations over the link. In addition to connecting to UAV 101b, UAV 101a, is connecting to either an end-user equipment or to a node of a fixed network (not shown), to which the wireless link is connected, while UAV 101c, in addition to connecting to UAV 101b, is connected to another end-user equipment or network node (not shown). It is to be understood that the UAVs, 101a,101b,101c are operating as mobile relay stations, capable of forwarding user and signalling content, applying a communication technique and format according to any prior art solution, which is out of the scope of this document.

System 100 of FIG. 1 also comprises a controller 600, which is capable of communicating directly with each of the UAVs 101*a*,101*b*,101*c*, via direct link 103*a*,103*b*,103*c*, respectively. According to one alternative embodiment, communication between the controller 600 and the UAVs 101*a*,101*b*,101*c* is instead provided by way of conventional device-to-device communication, where one of the UAVs, in the present case, typically UAV 101*b*, being located close to controller 600, is configured to receive data from the remaining UAVs 101*a*,101*c*, which data is then forwarded to the controller 600. Instructions can be provided from the controller 600 to the UAVs in a corresponding way. According to another alternative embodiment, the mentioned communication may be provided by combining both means of communication. The latter situation provides for redundant alternatives and more reliable communication.

Between UAVs 101*a*,101*b* there is a first distance 102*a*, forming a first hop, and between UAVs 101*b*,101*c* there is a second distance 102*b*, forming a second hop, where the two hops together form a wireless link, and where each mentioned distance represent typical adjustable parameters, decisive of the QoS of that hop, which may have impact on whether or not a respective QoS sub-target will be met or not. In the present example, UAV 101*b* may typically be reporting data, indicative of the status of the first hop, such as e.g. the mentioned distance and/or latency of the first hop, as experienced by UAV 101*b*.

A device, here referred to as an initiating device 104, which may e.g. form part of a base station or any other device or node of a wireless communication network, which is capable of recognising a trigger to initiate a wireless link, is configured to provide initial instructions to controller 600. As is indicated in FIG. 1, the initiating device 104 communicates at least with the controller 600, via communication link 105, after which the controller 600 instructs each of UAVs 101*a*,101*b*,101*b* to take a position along the generated wireless link and to operate as a mobile relay station, according to instructions, provided from the controller 600. Alternatively, such, initial instructions are transmitted directly to the respective UAVs by the initiating device 104, so as to form the wireless link, in case those UAVs are within range of the initiating device 104.

Although controller 600 of FIG. 1, also being an UAV in the present example, is not one of the mobile relay stations, participating in the relaying over the wireless link, it is to be understood that, in an alternative embodiment, controller 600 may be one of UAVs 101*a*,101*b*,101*c*, thereby operating both as a controller and as a relay station. Furthermore, according to yet an alternative embodiment, communication between the controller 600 and the UAVs 101*a*,101*b*,101*c*, may alternatively be provided via other nodes or devices which are within range and capable of forwarding data provided from the UAVs, accordingly. It is also to be understood that the controller 600, being illustrated as a UAV in FIG. 1, does not necessarily have to be a UAV, or even a mobile device, but may e.g. be a fixed base station or other type of access node, which has access, either directly, or indirectly, to all UAVs, forming the wireless link.

Figure 2:
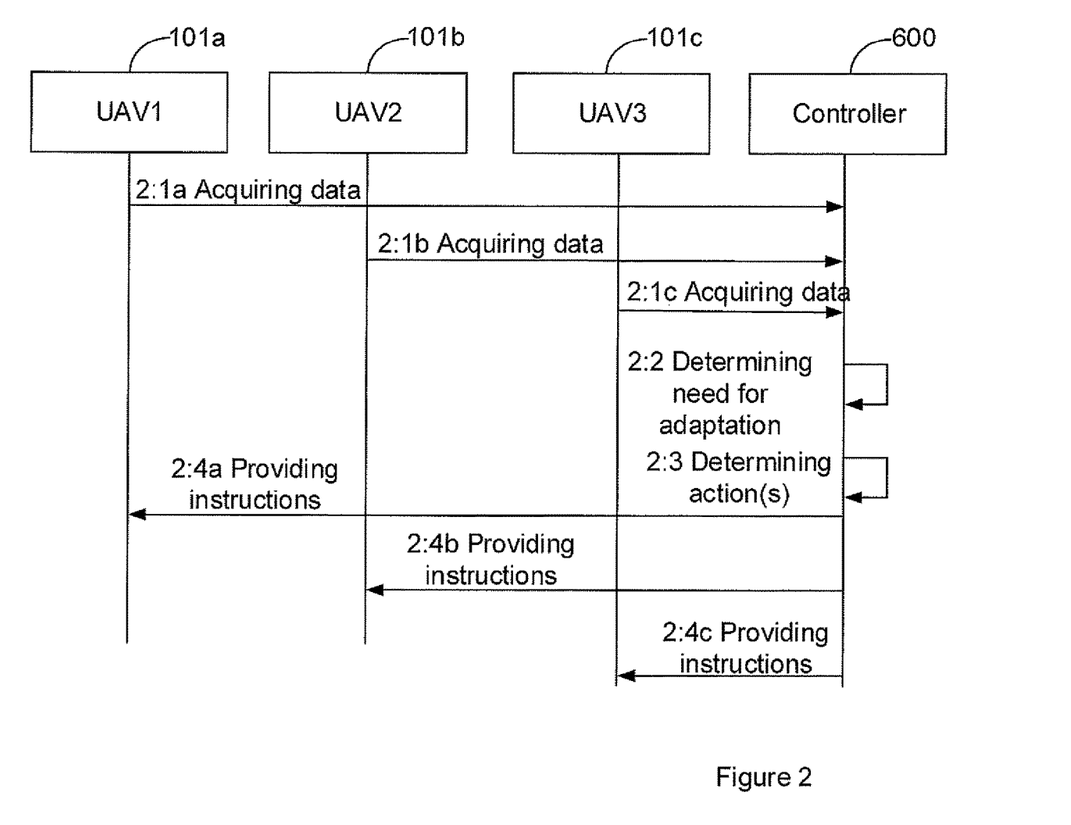
FIG. 2 is a signalling scheme, illustrating how a controller can interact with mobile relay stations, exemplified by UAVs when controlling the mobile relay stations.

FIG. 2 is a signalling scheme, illustrating how mobile relay stations, here again represented by UAVs, and a controller may interact with each other for maintaining a wireless link with a certain QoS target, divided into QoS sub-targets. As a prerequisite, all UAVs have been provided with initial instructions to set up a wireless link, instructions on what data to report, how and when to report to the controller 600. According to a first step 2:1*a*, controller 600 is then acquiring data from UAV1 101*a*, where the acquired data is indicating a present status of a hop to which the UAV is connected, here the hop between UAV1 101*a* and UAV2 101*b*. The mentioned data is reported by UAV1 101*a* via a control message at a specific frequency or interval, which may be static or dynamic, or triggered by a certain event. In step 2:1*b* and 2:1*c*, a respective corresponding procedure is executed by UAV2 101*b* and UAV3 101*c*, respectively. In another step 2:2 the controller 600, having parsed the received data, determines, based on the acquired data, if there is a need for adaptation at any of the hops of the wireless link, i.e. can the QoS sub-targets of the wireless link be met, without doing any adaptation to any of the hops, or can the QoS sub-targets only be met by adapting one or more hops. At this stage it is determined, for each hop, whether the parameter settings, presently applied at a UAV, will allow the QoS sub-target of the respective hop to be met or not. Such a determination can, according to a first embodiment, be based on the most recently collected data, i.e. on a real-time basis, or it can, according to a second embodiment, be based on predictions. Predictions may be applied according to any suitable method, and may be based e.g. on averaging historical data, on identifying a trigger point, when a QoS sub-target is experiencing a rapid change, or it can be based on the use of a Machine Learning algorithm.

Irrespective of if predictive decisions or real-time decisions are applied by the controller 600, or by another node, actual activities to be executed by an UAV may be decided centrally, by the controller, or locally, by the respective UAV, or in a combination of both, e.g. depending on reliability in communication between controller and the UAVs power situation. In another step 2:3, one or more actions that are considered needed for the QoS sub-targets to be met, is therefore determined by the controller 600. According to a first embodiment, applying a localized concept, this can be achieved by processing the acquired data, and considering alternative ways or options of adapting different hops of the wireless link. According to a second alternative, a decision that a QoS sub-target will not be met is taken by the controller 600, but only the fact that the respective QoS sub-target is not, or is predicted not to be met, is to be reported to the respective UAV, possibly together with data on which to base a decision by the UAV, e.g. a numerical interval within which adjustments are allowed by the UAV, thereby leaving the decision on how to cope with the upcoming situation to the UAV, rather than to the controller 600. According to a third embodiment, a decision that adaptations are needed is taken by the controller 600, while the actual adaptations are determined elsewhere in the system.

Once the required action/s has/have been determined by the controller 600, appropriate instructions, applicable for UAV1, i.e. instructions indicating adaptations that are to be made by AUV1 101*a*, are provided to that UAV in step 2:4*a*, and corresponding instructions are also sent to UAV2 101*b* in step 2:4*b* and to UAV3 101*c* in step 2:4*c*. In case a dynamic updating frequency is applied by one or more of the UAVs 101*a*,101*b*,101*c*, at least some of the mentioned instructions may also comprise instructions, indicating to a respective UAV how and when to change its data updating frequency. The decision to change the mentioned frequency is typically based on the outcome of step 2:2, where e.g. low battery capacity of one UAV, which UAV cannot instantly be replaced, may result in a reduction of signalling and a lower updating frequency. Typically, a lowering of the reporting frequency, will also result in providing instructions to a UAV to make more distinct and proactive adaptations, thereby providing for a larger safety margin for meeting the QoS sub-target. Such instructions may also comprise instructions on how to react to a replacement instruction, i.e. how to hand over from a UAV to be replaced to a replacing UAV, or how to again adapt the reporting frequency, e.g. based on change of certain parameter(s) at the UAV. In the latter scenario, a QoS sub-target may e.g. allow a maximum delay of 30 ms., whereas instructions to the UAV instructs the UAV to apply a reporting frequency of 10 s, in case the delay is <<30 ms, while it is to be changed to 5 s, in case the delay is <30 ms. and changed to 1 s in case the delay is approximately equal to 30 ms.

In step 2:3, action/s to be taken in order to meet the fact that adaptation is needed, as determined in step 2:2, is/are decided. Different possible options may be ranked differently, depending on the circumstances and data available to the controller 600, and especially in a prediction based scenario, different options may be executed sequentially, such that steps 2:2, 2:3 and 2:4a, 2:4b,2:4c and possibly also steps 2:1a-2:1c, are repeated until no more adaptation is required. Since an adaptation of one hop typically will effect also other hops, with respect to QoS, the suggested iterative process will typically involve more than one hop, or even all hops, depending on the reporting of the data, indicative of the hops. At least the process steps described in FIG. 2 are in any event repeated so that new data reported from the UAVs 101a,101b,101c is repeatedly compared to the QoS sub-targets for conformity.

Although FIG. 2 indicates direct contact between each UAV 101a,101b,101c and the controller 600, one or more of the UAVs 101a,101b,101c, may alternatively instead be assigned to receive data from other UAVs and aggregate the data, before the aggregated data is transmitted to controller 600. Aggregation of data may either be applied on a permanent basis, or the controller 600 may determine when the aggregation option shall be applied in a group of UAVs based on e.g. the battery power levels of the UAVs.

Although steps 2:2 and 2:3 are indicated as being executed by the controller 600 in FIG. 2, one or both of these steps may alternatively, fully or partly, be executed by another node, such as e.g. a node forming part of a cloud based solution. In the latter scenario, which may be advantageous e.g. in order to save battery consumption at the controller 600, the controller 600 may execute limited processing of acquired data or may even be limited to aggregating data, which is then forwarded to a remote node for determination of need for adaptation and/or of which action/s that is/are needed.

Figure 3:
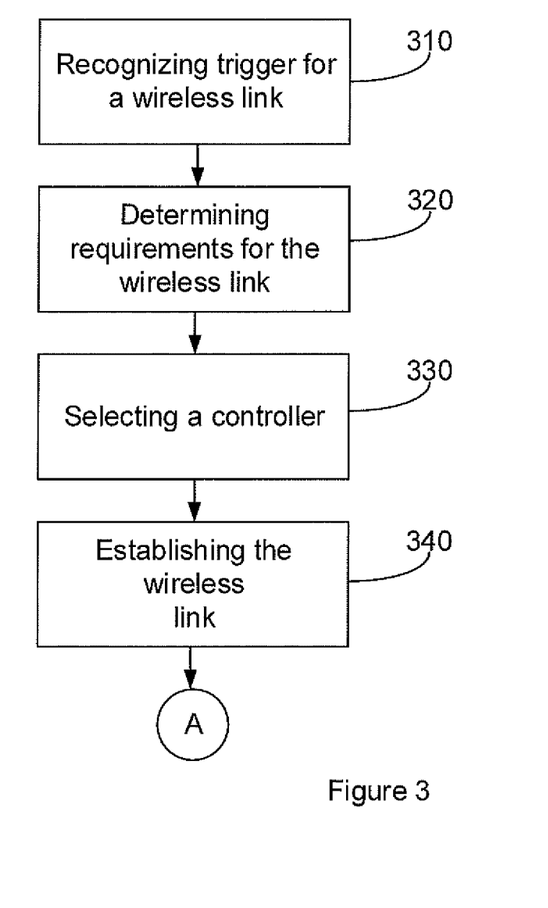
FIG. 3 is a flowchart illustrating a method for initiating a controllable wireless link.

FIG. 3 is a flow chart, illustrating method steps which are to be seen as a prerequisite for execution of the controlling as disclosed herein. The steps of FIG. 3 are to be executed by a node or device, such as the initiating device 104 of FIG. 1, or by other functionality which forms part of a system which is configured to operate as suggested herein. Alternatively, the mentioned steps are executable by the controller itself. Especially in case the controller forms part of a base station or any other type of fixed node, the initiating device and the controller may be combined, i.e. the controller also have initialization capabilities as described herein.

In a first step 310, a demand, i.e. a trigger, for establishing a wireless link, is recognized. Such a trigger may e.g. by a trigger, recognizing an alarm in a communication system, indicating that an ordinary communication link has, or is about to fail or to become insufficient for carrying expected traffic, or the trigger may be initiated manually by an operator, recognising that additional resources will be needed for handling an increase in traffic. The mentioned trigger initiates a process for determining requirements for the needed wireless link, as indicated in another step 320. Based on the data available, such requirements typically include to determine the number of required mobile relay stations and overall link requirements or targets, such as e.g. an overall latency target. At this stage, overall link requirements are also split up into QoS sub-targets, considered for each determined hop. Capability measures of each mobile relay station, available for use at the wireless link, such as e.g., the battery life time, the maximum transmission power, or the antenna configuration, may also be considered, at this stage. Based on such additional information, the position of each mobile relay station and the neighbour relation between adjacent mobile relay stations can be carefully tuned, aiming to form a maximized communication range for the wireless link.

In another step 330, a controller is selected, either from available fixed nodes, such as e.g. base stations, located within range of at least one of the mobile relay stations, or from the mentioned, selected mobile relay stations, which are capable of providing controller functionality, as described herein. The controller may e.g. be selected based on its closeness to one of the mentioned mobile relay stations, or with the aim of having a controller located symmetrically in the wireless link. The selection of the controller may also be based on the capability of the mobile relay stations, which may include e.g., one or more of the battery life time, the maximum transmission power, or the antenna configuration.

In a final step 340 of the described initialization process, the wireless link is established, according to the determined requirements and with the selected controller, controlling the wireless link. Step 340 includes transmitting instructions to the respective mobile relay stations, from the controller or any other device, such as e.g. the initiating device, mentioned above. Such instructions typically comprise instructions to a respective mobile relay station on where, physically, to locate, and instructions on how to best maintain the required QoS, with respect to e.g. transmission power, distance to an adjacent relay station, and a frequency to be applied when reporting data to the controller. Once the initial prerequisites for an operating wireless link has been fulfilled, the link can be adaptively controlled from the controller, as will be described below, with reference to FIG. 4.

Figure 4:
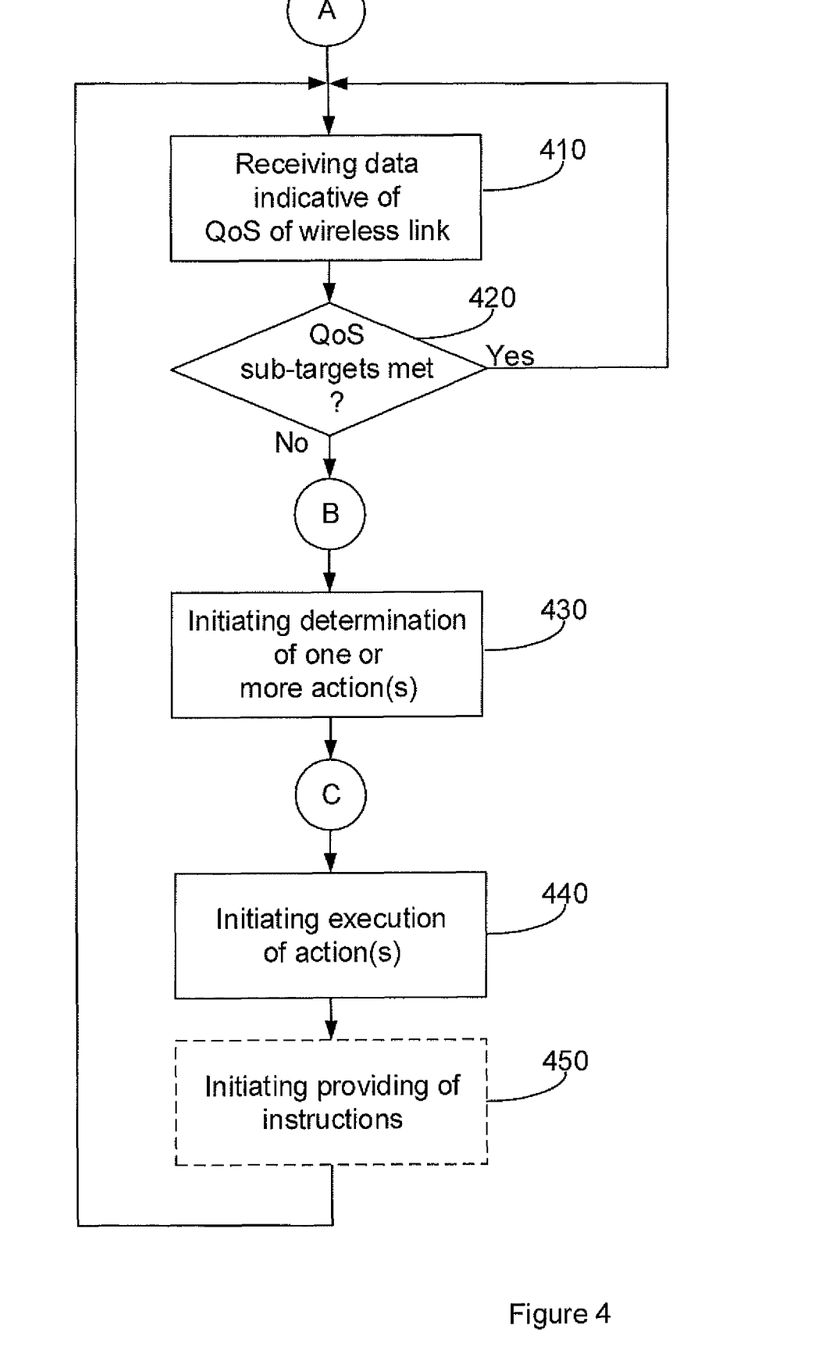
FIG. 4 is a flowchart illustrating a method for controlling mobile relay stations, setting up a wireless link.

FIG. 4 is illustrating a flow chart of a method, executable in a controller as described herein. It is to be understood that, prior to the execution of the steps mentioned below, a procedure, corresponding to the one described above, with reference to FIG. 3, has been executed. In a first step 410, data decisive of a QoS at a respective hop is provided from each mobile relay station to the controller in a control message. The mentioned data delivery may be executed in one single step, as indicated in the figure, e.g. in case data provided from a plurality of mobile relay stations has been aggregated, before it is provided to the controller from the aggregating mobile relay station in one aggregated control message. Alternatively, the data delivery may be executed by delivering a plurality of control messages, each sent to the controller from a respective mobile relay station. The mentioned control data may comprise one or more parameters, each being decisive of the QoS of a hop of the wireless link, and may include e.g. bitrate, latency, buffer size, battery level and transmission power (e.g. the maximum value, and the headroom). The more different parameters that are provided from the UAVs, the more adaptation options will of course be available for adaptation of the UAVs.

In a next step 420, which is executed when data has been received from the mobile relay station from which data is to be expected, it is determined if the different QoS sub-targets, meet with the requirements set for the hops of the wireless link. As long as the mentioned QoS sub-targets are met for all hops, the wireless link is considered to operate with satisfaction, with respect to the QoS, and no further action will be required, but the method can continue to step 410, awaiting updated data from the mobile relay stations. If, however, at least one QoS sub-target is found not to be met for a hop, the method continues by determining one or more actions to be executed by one or more of the mobile relay stations, comprised in the wireless link, as indicated with another step 430. More specifically, various options for making adjustments to mobile relay stations of the wireless link, rearranging the configuration of the wireless link, or a combination of both, may be considered.

In one example, we assume that one hop is experiencing increased latency, e.g. a latency increase is found to go above a preconfigured threshold value on a hop due to deteriorating link quality, leading to that the sub-targets of other hops are reduced in order to compensate and to make sure that the whole link will still meet the target. Furthermore, mobile relay stations of the other hops may need to increase the transmission power to meet the new latency target. For example, if there are two hops, including hop 1 and hop 2, in a link, the initial latency target for each hop may be 20 ms to fulfil the overall latency target of 40 ms. The latency target for hop 1 may be updated to 30 ms due to bad link quality. In this case, the latency target for hop 2 can be reduced to 10 ms in order to keep the overall latency target unchanged. The transmission power for hop 2 may then be increased to meet the new target. In another example, the actions mentioned in the first example above may be executed at an early stage, if one hop is observed to become worse continuously for a while.

According to a first embodiment, it is determined that the transmission power over a specific hop is to be adapted, in order to meet QoS requirements. According to a second embodiment, it is determined to change the transport format, such as e.g. the modulation code scheme (MCS), the transmission diversity or the number of antennas, applied by a mobile relay station. A change of the transport format can e.g. be triggered based on a specific change of the monitored link quality or based on an update of QoS sub-targets. According to a third embodiment it is determined to adjust the distance between two mobile relay stations, in order to improve transmission conditions of a specific hop. According to a fourth embodiment, it is determined to switch place between mobile relay stations in the wireless link. The latter scenario may e.g. be advantageous when the controller is also one of the mobile relay stations, of the wireless link, and where a more centralized or strategic place is desired for the controller in the wireless link. A switch of places of two mobile relay stations may also be beneficial in case a mobile relay station has reached its maximum transmission power, whereas the QoS sub-target is still not met for the respective hop, while at the same time, there is another neighbour mobile relay station on the wireless link that has more free transmission power. In this case, the two mobile relay stations can switch places so that the one or two relevant hops will be able to meet their respective QoS sub-target. According to a fifth embodiment, a mobile relay station is instructed to replace one of the mobile relay stations presently operating along the wireless link, e.g. due to low battery power of the mobile relay station to be replaced. According to a sixth embodiment, it is determined that the controller functionality is to be handed over from the present controller to another entity. However, since such handover procedure may lead to short interruptions on the services, it is preferred that it is executed during an idle slot, i.e., when the controller is not involved in any on-going transmissions.

Once determination of one or more actions to be taken with respect to one or more of the mobile relay stations has been initiated, as indicated in step 430, execution of the actual actions are initiated, as indicated with step 440. Such an initiation may include both triggering and execution of one or more actions, or only the triggering, whereas in the latter case the actual action is executed at another node or device. As indicated with an optional step 450, the transmission of the actual instructions, can be executed by the controller. Alternatively, another node or device may be triggered by the controller to transmit relevant instructions, or instructions may be sent to a remote node, which executes the actual action. By way of example, a fixed network node, such as e.g. an initiating device, may be instructed to order an additional mobile relay station, to form part of the wireless link, by adding it to the already operating mobile relay stations, or to replace one of the operating mobile relay stations. It is to be understood that any of steps 430, 440 and 450 may be fully executed by the controller, or in cooperation with an external node or device, such that e.g. a decision is reached by the controller, while the action/s is/are executed by the external node, e.g. in order to reduce battery consumption of the controller, especially when the controller forms part of a mobile relay station, such as e.g. a UAV.

Figure 5:
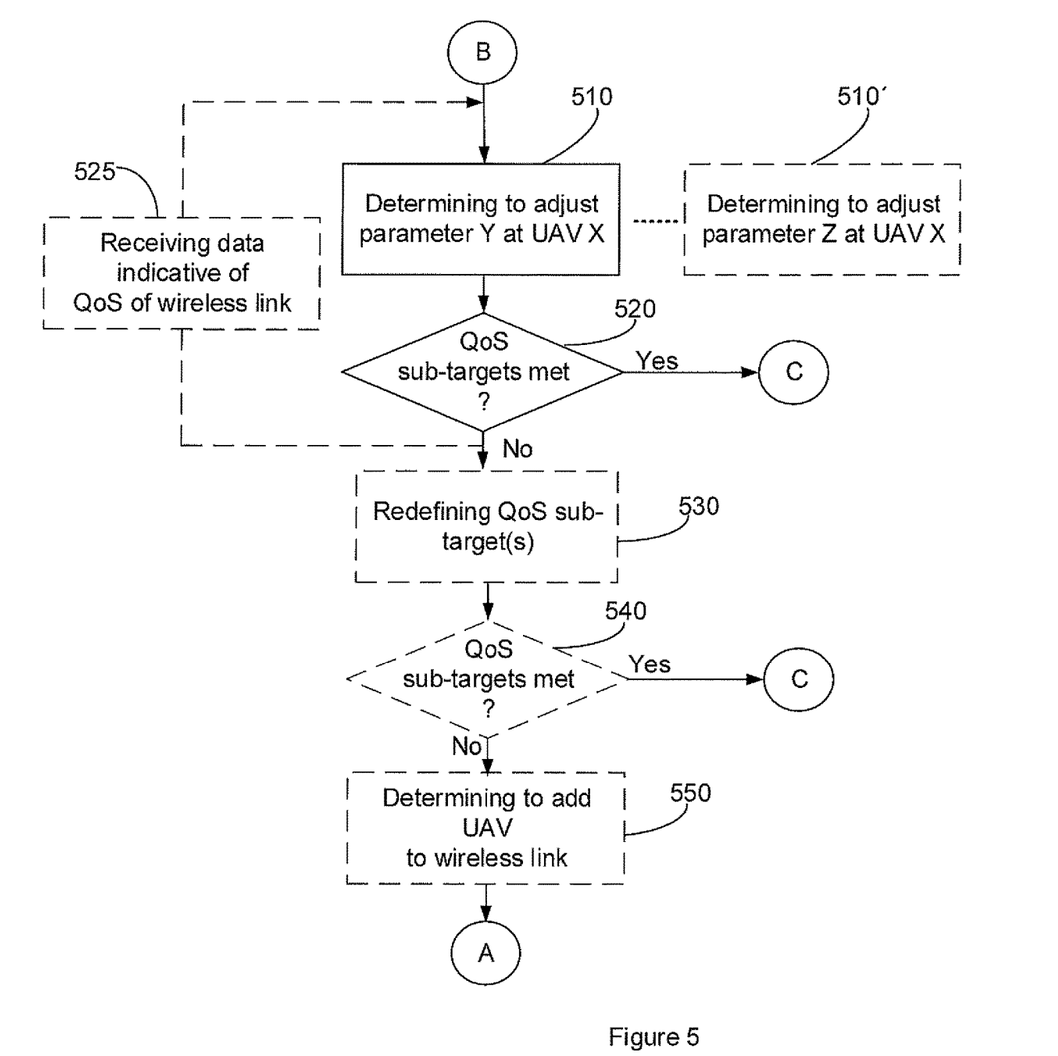
FIG. 5 is a flow chart illustrating, in further detail, how adaptation of a wireless link can be executed when controlling the mobile relay stations.

FIG. 5 is another flow chart, giving one possible example of how step 430 of FIG. 4 may be executed, according to one embodiment. The flow chart is to be seen as a continuation from point "B" of FIG. 4, further clarifying how determining of suitable action/s may start with investigating the possible options of adjusting a certain parameter Y, provided from a UAV X, as indicated with step 510 of FIG. 5. As already mentioned, such determination may be done in real-time, or as a prediction. Similar considerations may be done, sequentially or in parallel, also with respect to other parameters and/or other hops, as indicated with step 510'. If, after one or more determined adjustment/s, the QoS sub-targets are found to be met in step 520, the process is continued at point "C*" of FIG. 4, i.e. one or more suitable actions is/are initiated accordingly. If, on the other hand at least one QoS sub-target is found not to be met, available adjustment actions will obviously not be sufficient for achieving a certain QoS sub-target, but further activities will be needed.

If, in step 520 it is determined that any of the QoS sub-targets are not met, the controller may, at this stage, determine to redefine one or more of the QoS sub-targets, as suggested in optional step 530.

Alternatively, one or more further attempts to adapt other parameters, or combination of parameters, may be executed, prior to redefining any QoS sub-target, by receiving further data, indicative of QoS of the wireless link, as described with alternative step 525, followed by optional step 510'. Alternatively, step 510' may be executed parallel, prior to, or subsequent to step 510.

However, according to an alternative embodiment, the suggested redefining step 530 may be executed at an earlier stage. The latter scenario may e.g. be preferred in case it is more important that the wireless link is maintained operable than that it can provide a first set of QoS sub-targets.

If also redefining of QoS sub-targets is found to not be sufficient, e.g. due to that undesirable QoS sub-targets, which may result in a too low overall QoS on the wireless link, will be needed, the controller can decide, in a step 550, that a mobile relay station, such as e.g. a UAV, is to be added to the wireless link, since it is found that present number of mobile relay stations will not be sufficient for maintaining sufficient QoS sub-targets for all present hops.

A controller, capable of executing a method according to any of the embodiments presented above need to be adapted accordingly. More specifically, the controller is configured to receive data, decisive of the QoS of the hops of whether or not at least one QoS sub-target of one of the hops is, or is predicted, not to be met. If it is determined that at least one of the sub-targets will not, or is predicted not to be met, the controller is configured to initiate, for each of the hops, one or more actions for achieving that the at least one QoS target-value is met, and, based on the determining of one or more actions, the controller is configured to initiate execute of one or more of the determined actions, meaning in practice, execution of instructions of actions to be executed by one or more mobile relay stations. Initiating is here to be construed as meaning that any of the determining actions and initiating instructions can be executed either by the controller itself, or, upon having triggered such an activity at the controller, the actual execution can be done in another node or entity, such as e.g. in a base station, the initiating device 104, or in a cloud based solution, to which the controller have access. Similar reasoning is applicable also for the initiating steps suggested below.

The controller may be configured to receive data from the mobile relay stations by periodically monitoring the mobile relay stations, wherein the monitoring may be done, using a fixed monitoring frequency, or the frequency may be adaptable. According to one embodiment, individual frequencies may be monitored for different mobile relay stations based on the present status of the respective mobile relay station, such that e.g. the monitoring frequency is dependent on whether or not one or more parameters is/are close to a threshold value. According to another embodiment, monitoring is executed by monitoring each mobile relay station at a time, while according to another embodiment, all mobile relay stations are being monitored all at the same time. According to yet another embodiment, data is requested upon demand from the controller.

The controller is, according to one embodiment, configured to initiate distribution of instructions to already active mobile relay stations on how to adapt. Alternatively, or in combination, the controller is configured to provide instructions to a mobile relay station, other than the ones presently providing the wireless link, on how it shall contribute to the wireless link, i.e. how it shall be included as a further mobile relay station in the wireless link.

The controller is capable of initiating execution of a plurality of actions, wherein such actions may e.g. comprise instructing one of the mobile relay stations to adjust its transmission power, e.g. by increasing the transmission power to a certain transmission power or to a value within a given range. Alternatively, a mobile relay station may be instructed to adjust the transport format. A mobile relay station may be instructed to adjust the distance to a neighboring mobile relay station, e.g. by moving closer to the mentioned mobile relay station, while, at the same time naturally moving farther away from another, fixed or mobile relay station. Another action may be to instruct two mobile relay stations to switch places, if such an action is likely to improve the overall QoS situation for the wireless link.

In case the presently used mobile relay stations are not considered to be able to provide a sufficient QoS over the wireless link, a mobile relay station, other than the ones providing the wireless link, may be instructed to replace one of the mobile relay stations, e.g. due to that it has superior capabilities. Alternatively, the mobile relay station to be replaced may be about to run out of battery, or may experiencing a malfunction. Instead of replacing a mobile relay station, the new mobile relay station may be instructed to be added to the wireless link as a complementing mobile relay station. Another action may include instructing an entity, e.g. one of the mobile relay stations, or any other entity, capable of acting as a controller and being located within range of the mobile relay stations, to take over as a controller, i.e. to hand over the controller functionality.

The data received by the controller from a mobile relay station, may comprise various parameters, indicative of the present situation at the mobile relay station, including one or more of bitrate, latency, buffer size, battery level and transmission power.

The controller is, according to one embodiment, configured to execute the mentioned steps on a per service basis, i.e. different considerations may be applied depending on the service provided via the wireless link. Alternatively, the controller is configured to apply considerations on how to adjust on a device or group basis, such that e.g. the QoS target values for satisfying a certain group of users are decisive of how to adjust the various hops.

The controller may, according to one embodiment, be a UAV, separate from the mobile relay stations, providing the wireless link, or being one of these mobile relay stations. Alternatively, the controller form part of or is arranged as a fixed node or entity, which is capable of communicating with the mobile relay stations, providing the wireless link.

The QoS target values to be applied by the mobile relay stations may be provided from a separate entity, such as e.g. the initiating device, mentioned above, or the controller may be configured to provide such information to the mobile relay stations. Alternatively, the mentioned information may be provided from both types of devices, e.g. so that initial values are provided from an initiating device, while updated values are provided from the controller, when such an update is required by the controller or the other device. The controller may also be configured to determine that the reporting frequency of one or more of the mobile relay stations is to be changed, and to provide such updating information to the respective mobile relay station/s.

Figure 6:
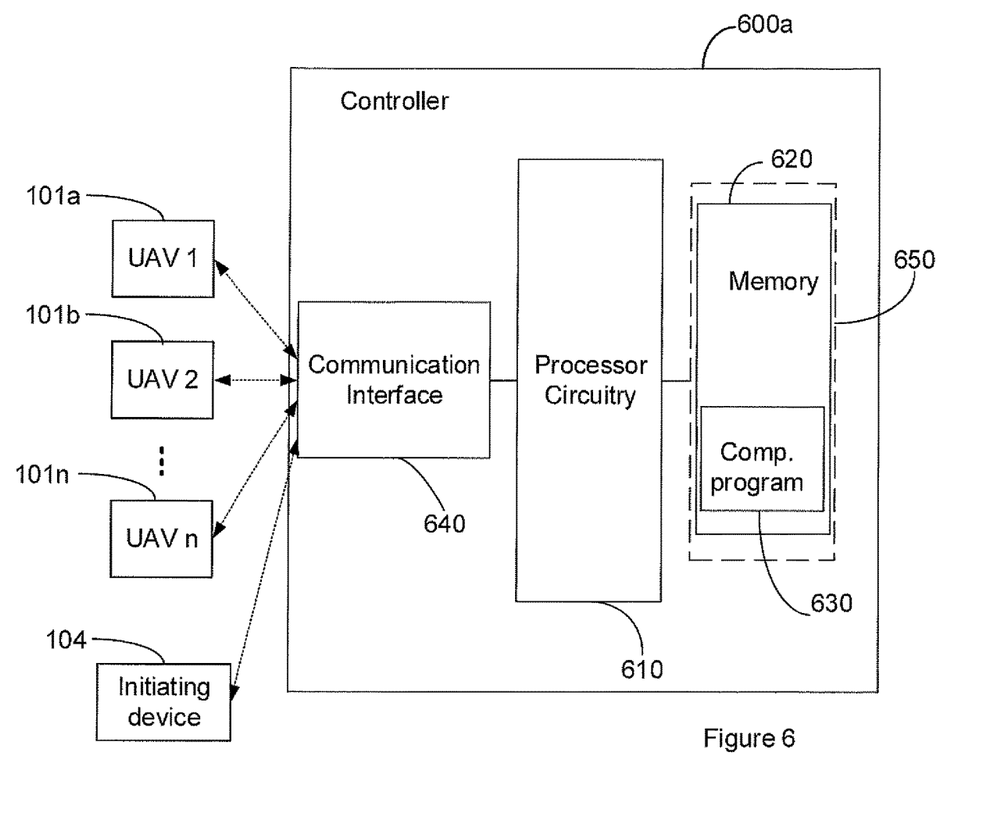
FIG. 6 is a block scheme of a controller according to a first aspect.

A controller, capable of executing as suggested above, according to one aspect, will now be described in further detail with reference to FIG. 6. Controller 600a of FIG. 6, comprises processor circuitry 610 and a memory 620, capable of storing instructions, or a computer program 630, which, when executed by the controller 600a is configured to cause the controller 600a to perform a method according to any of the embodiments described above. The controller 600a also comprises a communication interface 640, capable of providing communication with one or more mobile relay stations, here illustrated with UAVs 101a,101b . . . 101n, as well as an initiating device 104 or a device or node which is capable of providing corresponding functionality, in case such initiation functionality is not comprised in the controller 600a itself. Alternatively, the controller 600a comprise a plurality of communication interfaces, where e.g. one communication interface is configured as a transmitter, while another communication interface is configured as a receiver.

The processing circuitry 610 is provided using any combination of one or more central processing unit (CPU), multiprocessor, microcontroller, digital signal processor (DSP) or application specific integrated circuit. The memory 620 can be any combination of read and write memory (RAM) and read only memory (ROM) and can typically also comprise persistent storage, which, for example, can be any single one or combination of magnetic memory, optical memory, solid state memory or even remotely mounted memory. The controller 600a may also comprise a computer program product 650, comprising computer readable means, capable of storing the computer program 630, where the computer program product 650 can be embodied in a memory of the controller, or as a removable solid state memory, such as e.g. a flash storage memory. Such a computer program product can be provided as e.g. an optical disc, such as e.g. a Compact Disc (CD), a Digital Versatile Disc (DVD) or a Blu-Ray Disc.

Figure 7:
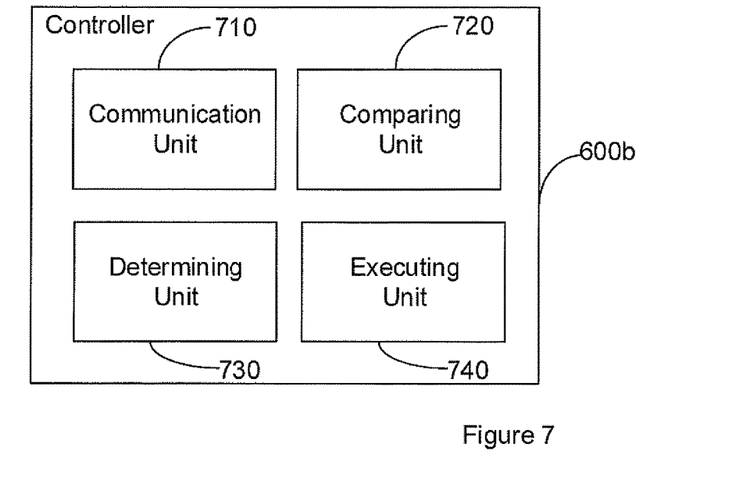
FIG. 7 is a block scheme of a controller according to a second aspect.

According to another aspect, a controller 600b can be configured as described in FIG. 7, comprising a plurality of mutually interacting functional units or modules, which are capable of executing a method according to any of the embodiments described herein.

More specifically, the controller 600b comprises a communication unit 710, capable of receiving data, indicative of a QoS of the respective hops of a wireless link, from mobile relay stations, corresponding to step 410 of FIG. 4. The controller 600b also comprises a comparing unit 720, capable of determining whether or not the mentioned QoS sub-targets are, or are predicted, not to be met, based on the data received from the mobile relay stations. The mentioned determining is executed by comparing data associated with a hop with a QoS target-value, or QoS sub-target of that hop, and by determining the impact that the respective one or more parameters, provided in the mentioned data, will have on the QoS or the wireless link. In case prediction is applied, any known prediction algorithm may be applied, which is capable of making a prediction based on the applied data. The suggested comparing of the comparing unit 720, corresponds to step 420 of FIG. 4. A determining unit 730 of the controller 600b, is configured to initiate determining of one or more action/s that is/are to be executed for adjusting the QoS at the relevant one or more hops of the wireless link, corresponding to step 430 of FIG. 4.

An executing unit 740 is configured to initiate execution of one or more actions to be executed at one or more mobile relay stations, corresponding to step 440 of FIG. 4. As indicated above, the execution unit 740, may be configured to execute a determined action, or to only trigger execution of a determined action, wherein the actual execution is done in another entity, such as e.g. in a node, forming part of a cloud solution. By way of example, the comparing unit 420 may instruct the determining unit 730, to determine one or more actions, which may result in determining that an increase of the transmission power is to be executed with a certain amount, i.e. to initiate a power increase at the mobile relay station, whereas the actual action of increasing is executed by the mobile relay station. According to another example, the determining unit 730, is instead determining that activation of a mobile relay station, which is going to be included into the wireless link, is needed. The execution unit 740, provides instructions, or initiates such a process to be executed elsewhere. In case instructions are provided by the executing unit 740, they are transmitted via communication unit 710, or via a separate communication unit (not shown), e.g. in case different means of communication is applied for the transmission of data from the mobile relay stations to the controller 600b and for the transmission of instructions, or initiation of instructions, from the controller 600b.

It should be noted that FIG. 7 merely illustrates various functional units of the controller 600b in a logical sense. The functions in practice may be implemented using any suitable software and hardware means/circuits. Thus, the embodiments are generally not limited to the shown structures of the controller 600b and the functional units. By way of example, controller 600b may comprise a plurality of communication units, or modules, where each communication unit is capable of handling different communication protocols. Similarly, a unit comprising a combination of what is described above as a determining unit and an activation unit, may be configured to execute functionality for determining both that an adaptation is required and which adaptation that is required, by applying principles as described herein.

The invention claimed is:

1. A system for controlling the Quality of Service (QoS) of a wireless link, the wireless link providing a service from a transmitting entity to a receiving entity, the system comprising:
   a controller controlling a plurality of relay stations, including a plurality of mobile relay stations providing the wireless link;
   wherein the controller is configured to:
      receive data, decisive of the QoS of hops of the wireless link;
      determine, based on the received data, that at least one QoS target-value of one of the hops is, or is predicted, not to be met;
      determine, for at least one of the hops, one or more actions for achieving that the at least one QoS target-value is met; and
      initiate, based on the determining of one or more actions, execution of the one or more determined actions, wherein the initiating execution of one or more actions comprises:
         initiating distribution of instructions, to a mobile relay station other than one of the mobile relay stations providing the wireless link, on how to contribute to the wireless link;
      determine for each mobile relay station and based on the received data, instructions indicative of which frequency to be applied by the respective mobile relay station when providing data to the controller; and
      transmit the respective instructions to the respective mobile relay station.

2. A method, at a controller, for controlling the Quality of Service (QoS) of a wireless link; the wireless link providing a service from a transmitting entity to a receiving entity; the wireless link being provided by a plurality of relay stations, including a plurality of mobile relay stations; the method comprising:
   receiving data, decisive of the QoS of hops of the wireless link;
   determining, based on the received data, that at least one QoS target-value of one of the hops is, or is predicted, not to be met;
   initiating, for at least one of the hops, determination of one or more actions for achieving that the at least one QoS target-value is met; and
   initiating, based on the determining of one or more actions, execution of one or more of the determined actions, wherein the initiating execution of one or more actions comprises:
      initiating distribution of instructions, to a mobile relay station other than one of the mobile relay stations providing the wireless link, on how to contribute to the wireless link;
      determining, for each mobile relay station and based on the received data, instructions indicative of which frequency to be applied by the respective mobile relay station when providing data to the controller; and transmitting the respective instructions to the respective mobile relay station.

3. The method of claim 2, wherein the receiving is achieved by periodically monitoring each mobile relay station.

4. The method of claim 2, wherein the initiation of execution of one or more actions comprises:
instructing one of the mobile relay stations to adjust its transmission power;
instructing one of the mobile relay stations to adjust its transport format;
instructing one of the mobile relay stations to adjust the distance to at least one of the other mobile relay stations;
instructing two of the mobile relay stations to switch places in the link;
instructing a mobile relay station, other than one of the mobile relay stations, to replace one of the mobile relay stations;
instructing a mobile relay station, other than one of the mobile relay stations, to be added to the wireless link; and/or
instructing handing over of the controller functionality from the controller to another entity, capable of acting as a controller.

5. The method of claim 2, wherein the received data comprises:
a bitrate of one of the mobile relay stations;
a latency of one of the mobile relay stations;
a buffer level of one of the mobile relay stations;
a battery level of one of the mobile relay stations; and/or
a transmission power of one of the mobile relay stations.

6. The method of claim 2, wherein the QoS is controlled on a per service basis.

7. The method of claim 2, further comprising:
initiating, for each mobile relay station, a QoS target-value, relevant for a hop to which the respective mobile relay station is connected; and
transmitting, to each of the mobile relay stations, the respective QoS target-value.

8. The method of claim 7, further comprising redefining the QoS target-value applicable for at least one of the hops.

9. The method of claim 2, further comprising:
determining, for each mobile relay station and based on the received data, instructions indicative of which frequency to be applied by the respective mobile relay station when providing data to the controller; and
transmitting the respective instructions to the respective mobile relay station.

10. A controller for controlling the Quality of Service (QoS) of a wireless link; the wireless link providing a service from a transmitting entity to a receiving entity; the wireless link being provided by a plurality of relay stations, including a plurality of mobile relay stations, the controller comprising:
processing circuitry;
memory containing instructions executable by the processing circuitry whereby the controller is operative to:
receive data, decisive of the QoS of hops of the wireless link;
determine, based on the received data, that at least one QoS target-value of one of the hops is, or is predicted, not to be met;
initiate, for at least one of the hops, determination of one or more actions for achieving that the at least one QoS target-value is met; and
initiate, based on the determining of one or more actions, execution of one or more of the determined actions, wherein the initiating execution of one or more actions comprises:
initiating distribution of instructions, to a mobile relay station other than one of the mobile relay stations providing the wireless link, on how to contribute to the wireless link; and
determine for each mobile relay station and based on the received data, instructions indicative of which frequency to be applied by the respective mobile relay station when providing data to the controller; and
transmit the respective instructions to the respective mobile relay station.

11. The controller of claim 10, wherein the instructions are such that the controller is operative to receive the data by periodically monitoring each mobile relay station.

12. The controller of claim 10, wherein the instructions are such that the controller is operative to, when initiating an execution of one or more actions:
initiate distribution of instructions, to at least one of the mobile relay stations, on how the respective mobile relay station shall adapt to the determined QoS value; and/or
initiate distribution of instructions, to a mobile relay station other than one of the mobile relay stations, on how to contribute to the wireless link.

13. The controller of claim 12, wherein the instructions are such that the controller is operative to, when initiating execution of one or more actions:
instruct one of the mobile relay stations to adjust its transmission power;
instruct one of the mobile relay stations to adjust its transport format;
instruct one of the mobile relay stations to adjust the distance to at least one of the other mobile relay stations;
instruct two of the mobile relay stations to switch places in the link;
instruct a mobile relay station, other than one of the mobile relay stations, to replace one of the mobile relay stations;
instruct a mobile relay station, other than one of the mobile relay stations, to be added to the wireless link; and/or
instruct handing over of the controller functionality from the controller to another entity, capable of acting as a controller.

14. The controller of claim 10, wherein the received data comprises:
a bitrate of one of the mobile relay stations;
a latency of one of the mobile relay stations;
a buffer level of one of the mobile relay stations;
a battery level of one of the mobile relay stations; and/or
a transmission power of one of the mobile relay stations.

15. The controller of claim 10, wherein the instructions are such that the controller is operative to control the QoS on a per service basis.

16. The controller of claim 10, wherein the controller is an Unmanned Aerial Vehicle.

17. The controller of claim 10, wherein the instructions are such that the controller is operative to:

initiate, for each mobile relay station, a QoS target-value, relevant for a hop to which the respective mobile relay station is connected; and transmit, to each of the mobile relay stations, the respective QoS target-value.

18. The controller of claim 17, wherein the instructions are such that the controller is operative to redefine the QoS target-value applicable for at least one of the hops.

19. The controller of claim 10, wherein the instructions are such that the controller is operative to:

determine, for each mobile relay station and based on the received data, instructions indicative of which frequency to be applied by the respective mobile relay station when providing data to the controller; and transmit the respective instructions to the respective mobile relay station.

* * * * *